US012603769B2

(12) United States Patent
Campiglio et al.

(10) Patent No.: US 12,603,769 B2
(45) Date of Patent: Apr. 14, 2026

(54) TIME-COORDINATED ADDRESS ROTATION

(71) Applicant: Cisco Technology, Inc., San Jose, CA (US)

(72) Inventors: Ugo Campiglio, Ecublens (CH); Domenico Ficara, Essertines-sur-Yverdon (CH); Jerome Henry, Pittsboro, NC (US); Amine Choukir, Ecublens (CH); Javier Contreras, Barcelona (ES)

(73) Assignee: Cisco Technology, Inc., San Jose, CA (US)

( * ) Notice: Subject to any disclaimer, the term of this patent is extended or adjusted under 35 U.S.C. 154(b) by 67 days.

(21) Appl. No.: 18/607,005

(22) Filed: Mar. 15, 2024

(65) Prior Publication Data

US 2025/0219817 A1    Jul. 3, 2025

Related U.S. Application Data

(60) Provisional application No. 63/615,207, filed on Dec. 27, 2023.

(51) Int. Cl.
H04L 9/08 (2006.01)
H04L 29/06 (2006.01)

(52) U.S. Cl.
CPC ............ H04L 9/0869 (2013.01); H04L 9/085 (2013.01)

(58) Field of Classification Search
CPC ..... H04L 9/0869; H04L 9/085; H04L 9/0861; H04L 9/3297; H04L 63/0876; H04L 63/108; H04L 63/16; H04L 63/20; H04L 63/205
See application file for complete search history.

(56) References Cited

U.S. PATENT DOCUMENTS

| | | | |
|---|---|---|---|
| 10,979,898 B1 | 4/2021 | Salem | |
| 2013/0311607 A1 | 11/2013 | Larson et al. | |
| 2021/0329500 A1* | 10/2021 | Cariou | ................. H04W 28/24 |
| 2022/0377042 A1 | 11/2022 | Henry et al. | |

(Continued)

OTHER PUBLICATIONS

International Search Report and Written Opinion for International Application No. PCT/US2024/059618, mailed Apr. 3, 2025, 18 Pages.

*Primary Examiner* — Edward Zee
(74) *Attorney, Agent, or Firm* — Rutan & Tucker, LLP; Ravi Mohan; Marc A. McClain

(57) ABSTRACT

Devices, networks, systems, methods, and processes for rotating a Media Access Control (MAC) address of a device. A device can negotiate a periodicity for address rotation of the MAC address associated with the device. The device may receive a data frame and generate seed data based on the data frame. The device can also utilize a shared secret key, a cryptographic hash function, and/or a cryptographically secure pseudorandom number generator to generate the seed data. The device can determine timestamp data based on the periodicity or a time of reception of the data frame. The device may utilize a pseudorandom function to determine the MAC address based on the timestamp data and the seed data. The device can generate the MAC address after every rotation cycle. Upon waking up from a power saving mode, the device can synchronize with a network device to generate next MAC address.

18 Claims, 8 Drawing Sheets

(56)         References Cited

U.S. PATENT DOCUMENTS

| | | |
|---|---|---|
| 2022/0385624 A1 | 12/2022 | Muccifora et al. |
| 2023/0089319 A1 | 3/2023 | Kneckt et al. |
| 2023/0300131 A1 | 9/2023 | Fang |
| 2023/0300751 A1* | 9/2023 | Ficara ............... H04W 52/0235 |
| | | 370/311 |
| 2023/0319943 A1 | 10/2023 | Barton et al. |

* cited by examiner

Figure 4:
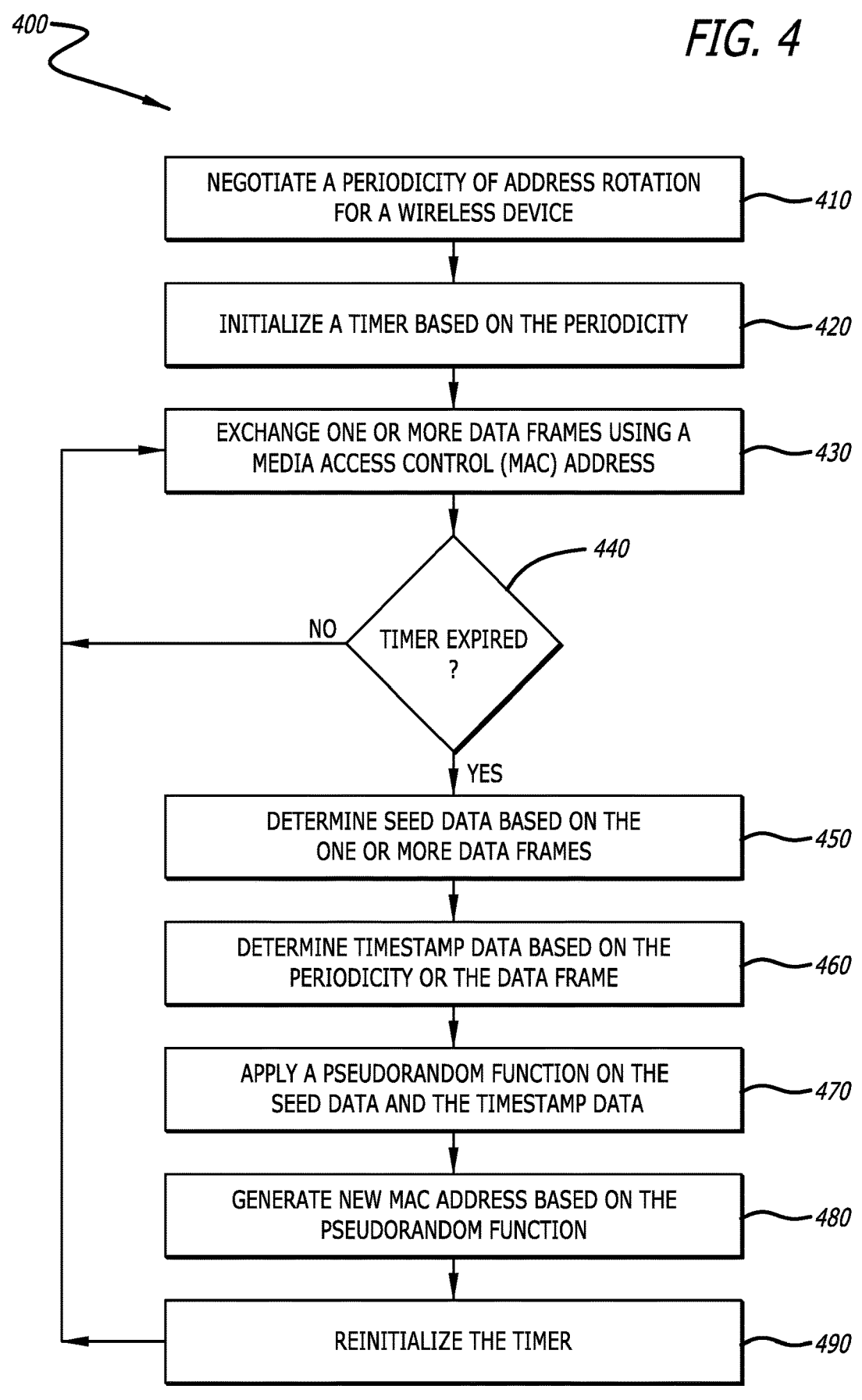

```
┌─────────────────────────────────────────┐
│ NEGOTIATE A PERIODICITY OF ADDRESS       │──── 410
│ ROTATION FOR A WIRELESS DEVICE           │
└─────────────────────────────────────────┘
                    │
                    ▼
┌─────────────────────────────────────────┐
│ INITIALIZE A TIMER BASED ON THE          │──── 420
│ PERIODICITY                              │
└─────────────────────────────────────────┘
                    │
                    ▼
┌─────────────────────────────────────────┐
│ EXCHANGE ONE OR MORE DATA FRAMES USING A │──── 430
│ MEDIA ACCESS CONTROL (MAC) ADDRESS       │
└─────────────────────────────────────────┘
                    │
                    ▼
              ◇ 440
         ┌────────────┐
    NO   │   TIMER    │
◄────────│  EXPIRED   │
         │     ?      │
         └────────────┘
               │ YES
               ▼
┌─────────────────────────────────────────┐
│ DETERMINE SEED DATA BASED ON THE         │──── 450
│ ONE OR MORE DATA FRAMES                  │
└─────────────────────────────────────────┘
                    │
                    ▼
┌─────────────────────────────────────────┐
│ DETERMINE TIMESTAMP DATA BASED ON THE    │──── 460
│ PERIODICITY OR THE DATA FRAME            │
└─────────────────────────────────────────┘
                    │
                    ▼
┌─────────────────────────────────────────┐
│ APPLY A PSEUDORANDOM FUNCTION ON THE     │──── 470
│ SEED DATA AND THE TIMESTAMP DATA         │
└─────────────────────────────────────────┘
                    │
                    ▼
┌─────────────────────────────────────────┐
│ GENERATE NEW MAC ADDRESS BASED ON THE    │──── 480
│ PSEUDORANDOM FUNCTION                    │
└─────────────────────────────────────────┘
                    │
                    ▼
┌─────────────────────────────────────────┐
│ REINITIALIZE THE TIMER                   │──── 490
└─────────────────────────────────────────┘
```

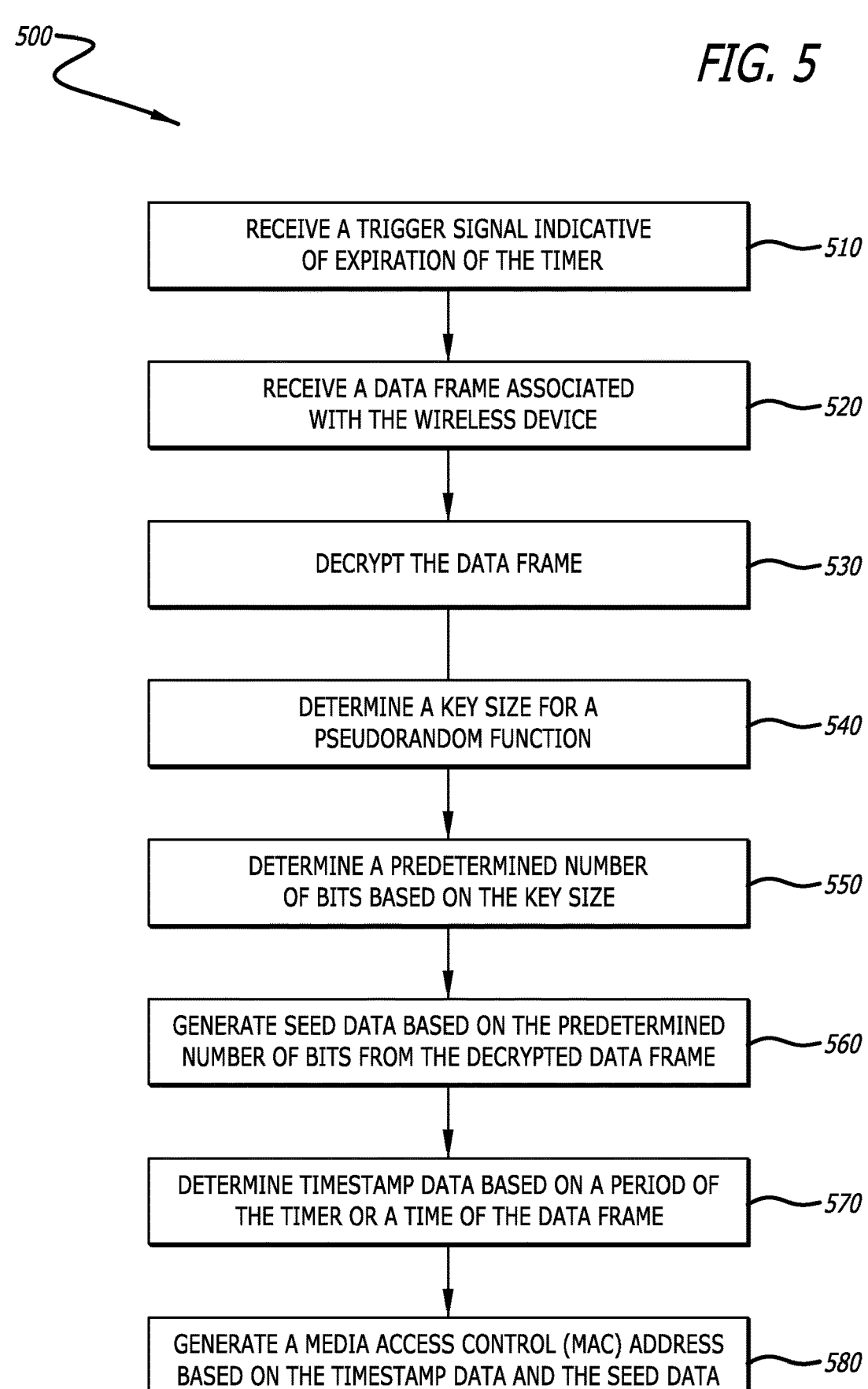

RECEIVE A TRIGGER SIGNAL INDICATIVE OF EXPIRATION OF THE TIMER ～510

RECEIVE A DATA FRAME ASSOCIATED WITH THE WIRELESS DEVICE ～520

DECRYPT THE DATA FRAME ～530

DETERMINE A KEY SIZE FOR A PSEUDORANDOM FUNCTION ～540

DETERMINE A PREDETERMINED NUMBER OF BITS BASED ON THE KEY SIZE ～550

GENERATE SEED DATA BASED ON THE PREDETERMINED NUMBER OF BITS FROM THE DECRYPTED DATA FRAME ～560

DETERMINE TIMESTAMP DATA BASED ON A PERIOD OF THE TIMER OR A TIME OF THE DATA FRAME ～570

GENERATE A MEDIA ACCESS CONTROL (MAC) ADDRESS BASED ON THE TIMESTAMP DATA AND THE SEED DATA ～580

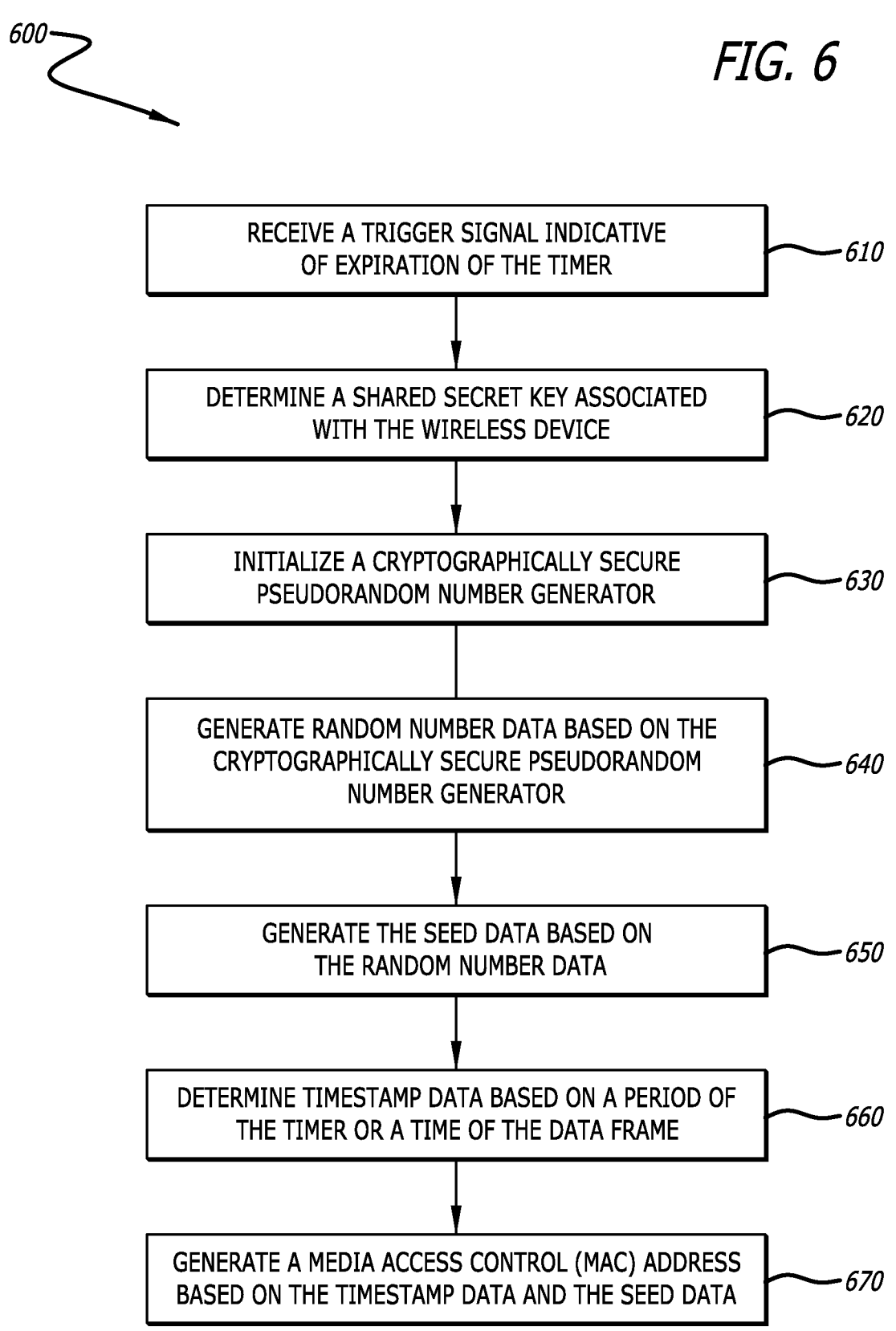

RECEIVE A TRIGGER SIGNAL INDICATIVE OF EXPIRATION OF THE TIMER — 610

DETERMINE A SHARED SECRET KEY ASSOCIATED WITH THE WIRELESS DEVICE — 620

INITIALIZE A CRYPTOGRAPHICALLY SECURE PSEUDORANDOM NUMBER GENERATOR — 630

GENERATE RANDOM NUMBER DATA BASED ON THE CRYPTOGRAPHICALLY SECURE PSEUDORANDOM NUMBER GENERATOR — 640

GENERATE THE SEED DATA BASED ON THE RANDOM NUMBER DATA — 650

DETERMINE TIMESTAMP DATA BASED ON A PERIOD OF THE TIMER OR A TIME OF THE DATA FRAME — 660

GENERATE A MEDIA ACCESS CONTROL (MAC) ADDRESS BASED ON THE TIMESTAMP DATA AND THE SEED DATA — 670

*700*

TIME-COORDINATED ADDRESS ROTATION

CROSS-REFERENCE TO RELATED APPLICATION

This application claims the benefit of U.S. Provisional Patent Application No. 63/615,207, filed Dec. 27, 2023, which is incorporated by reference herein in its entirety.

The present disclosure relates to wireless communication systems. More particularly, the present disclosure relates to address rotation for improving user privacy in the wireless communication systems.

BACKGROUND

Wireless communication networks rely on hardware addresses, such as Media Access Control (MAC) addresses, to identify devices in the wireless communication networks. It is essential to provide users with a capability to evade tracking while being connected to the wireless communication network. In a method to evade tracking, the MAC addresses of the devices are rotated or randomized. In traditional networks, the devices use fixed MAC addresses, and hence, are vulnerable to tracking. By rotating or randomizing the MAC addresses, tracking attempts can be prevented, thereby enhancing user privacy.

In many conventional MAC address rotation or randomization techniques, generation of next MAC address typically relies on previous MAC address and a shared input between an Access Point (AP) and the devices. However, if the previous MAC address of a device is known to an observer, the observer could calculate the next MAC address of the device. This poses a significant risk as a malicious observer could exploit the next MAC address to track and monitor user activity on the device.

This association between the previous and next MAC addresses undermines user privacy and compromises the integrity of the wireless communication network. Further, by associating the previous and next MAC addresses, any malicious observer could also track and profile users' activities across different sessions on the device, thereby compromising anonymity and privacy of the users within the wireless communication network. Therefore, there is a need for a technique to perform dynamic MAC address rotation to improve the privacy of the users in the wireless communication networks.

SUMMARY OF THE DISCLOSURE

Systems and methods for generating and rotating Media Access Control (MAC) addresses of devices in a wireless communication network in accordance with embodiments of the disclosure are described herein. In some embodiments, a device includes a processor, a memory communicatively coupled to the processor, and an address rotation logic configured to determine a periodicity of address rotation for a wireless device, initiate a timer based on the periodicity, determine, upon expiration of the timer, seed data and timestamp data, and apply a pseudorandom function on the seed data and the timestamp data to generate a Media Access Control (MAC) address.

In some embodiments, the address rotation logic is further configured to transmit a data frame to the wireless device, or receive the data frame from the wireless device.

In some embodiments, the timestamp data is indicative of a time of transmission or reception of the data frame.

In some embodiments, the timestamp data is indicative of a time of expiration of the timer.

In some embodiments, the address rotation logic is further configured to decrypt the data frame to generate a decrypted data frame, determine a predetermined number of bits of the decrypted data frame, and generate the seed data based on the predetermined number of bits.

In some embodiments, the address rotation logic is further configured to determine the predetermined number of bits based on a key size of the pseudorandom function.

In some embodiments, the address rotation logic is further configured to initialize a cryptographically secure pseudorandom number generator, generate random number data based on the cryptographically secure pseudorandom number generator, and generate the seed data based on the random number data.

In some embodiments, the address rotation logic is further configured to determine a shared secret key associated with the wireless device, and generate the seed data based on the shared secret key.

In some embodiments, the address rotation logic is further configured to apply a cryptographic hash function on the timestamp data and the shared secret key to generate the MAC address.

In some embodiments, the address rotation logic is further configured to reinitiate the timer after generating the MAC address.

In some embodiments, the address rotation logic is further configured to operate in a sleep mode, transmit a synchronization request upon switching from the sleep mode to an operational mode, receive a synchronization response in response to the synchronization request, and determine the MAC address based on the synchronization response.

In some embodiments, the synchronization request is at least one of a null data frame, or a Target Wake Time (TWT) request frame.

In some embodiments, the address rotation logic is further configured to receive a plurality of data frames in the sleep mode based on a previous MAC address.

In some embodiments, after a period of time indicated by the periodicity, the timer expires or reinitializes.

In some embodiments, an address rotation logic is configured to determine a periodicity of address rotation for a wireless device, receive a data frame from the wireless device, determine timestamp data based on the periodicity or the data frame, and generate a Media Access Control (MAC) address based on the timestamp data and the data frame.

In some embodiments, the address rotation logic is further configured to decrypt the data frame to generate a decrypted data frame, and determine a predetermined number of bits of the decrypted data frame.

In some embodiments, the address rotation logic is further configured to generate seed data based on the predetermined number of bits, and apply a pseudorandom function on the seed data and the timestamp data to generate the MAC address.

In some embodiments, the address rotation logic is further configured to determine a shared secret key associated with the wireless device, and apply a cryptographic hash function on the timestamp data and the shared secret key to generate the MAC address.

In some embodiments, a method includes determining a periodicity of address rotation for a wireless device, initiating a timer based on the periodicity, determining, upon expiration of the timer, seed data and timestamp data, and applying a pseudorandom function on the seed data and the timestamp data to generate a Media Access Control (MAC) address.

In some embodiments, a method includes receiving a data frame from the wireless device, determining the seed data based on the data frame, and determining the timestamp data based on the timer or the data frame.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a flowchart depicting a process for generating a Media Access Control (MAC) address, in accordance with various embodiments of the disclosure;

FIG. 5 is a flowchart depicting a process for generating a Media Access Control (MAC) address, in accordance with various embodiments of the disclosure;

FIG. 6 is a flowchart depicting a process for utilizing a cryptographically secure pseudorandom number generator for generation of a Media Access Control (MAC) address, in accordance with various embodiments of the disclosure;

Figure 1:
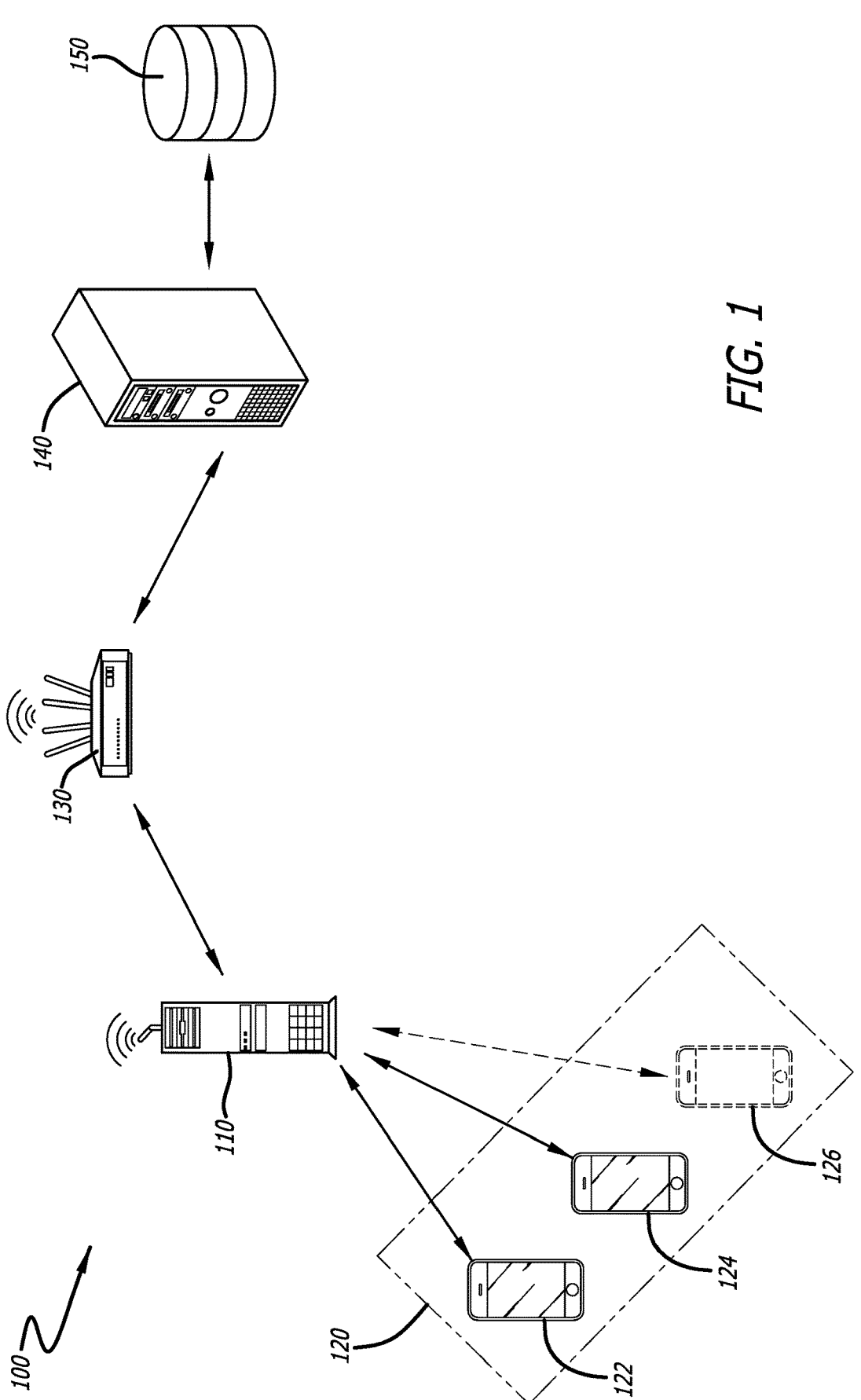
FIG. 1 is a conceptual illustration of a wireless communication network, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that generate and rotate Media Access Control (MAC) addresses of devices in a wireless communication network. A communication network may comprise an Access Point (AP) and one or more wireless devices. Examples of the wireless devices include, but are not limited to smartphones, tablets, watches, computers, laptops, home appliances, etc. The AP may be in communication with the wireless devices by way of a wireless communication network such as Wi-Fi. In that, the AP can utilize one or more Radio Frequency (RF) channels to communicate with the wireless devices. The RF channels can be across various RF frequency bands, such as but not limited to 2.4 GHz, 5 GHZ, and 6 GHz etc. for example. The wireless communication network can also utilize mmWave bands or Sub-1 GHz band to communicate with certain types of wireless devices. The wireless devices are usually assigned with MAC addresses that are unique identifiers to identify the wireless devices. Often, the MAC addresses are stored in a Network Interface Card (NIC) of the wireless devices. In secured wireless communication networks, the AP can rotate or randomize the MAC addresses assigned to the wireless devices. In some embodiments, for example, the AP and the wireless devices, both may calculate new MAC addresses. In certain embodiments, the AP and the wireless devices can select a MAC address from a plurality of MAC addresses.

In many embodiments, the AP and the wireless device may negotiate a periodicity of address rotation. The periodicity may indicate a period of time after which the wireless device must be assigned next MAC address or calculate the new MAC address. In some embodiments, the periodicity can be different for different wireless devices. The wireless devices may negotiate the periodicity while being connected to the AP or when associating with the AP. In certain embodiments, the periodicity can be broadcast by the AP, and utilized by a plurality of wireless devices in communication with the AP. In that, the AP can broadcast the periodicity by way of one or more management frames or beacon frames. The plurality of wireless devices in communication with the AP may utilize the periodicity broadcast by the AP to generate respective MAC addresses at same time, and at regular intervals.

In a number of embodiments, the periodicity can be determined based on one or more factors, such as but not limited to, security requirements, network policies, and device capabilities. In some embodiments, for example, the periodicity may indicate a fixed time interval or a randomized time interval. In certain embodiments, for example, the periodicity can vary based on event-based rotation, dynamic rotation based on usage patterns of the wireless devices, adaptive rotation based on threat assessment or user privacy requirements, user-defined rotation, regulatory requirements, or requirements of network protocols, etc. In more embodiments, for example, the AP and/or the wireless device can utilize one or more Machine Learning (ML) techniques to determine or optimize the periodicity of address rotation. In some more embodiments, for example, the periodicity may be modified or changed by the AP and/or the wireless device based on one or more dynamic changes in the wireless communication network. Hence, the wireless communication network can provide flexibility in determination and utilization of the rotation cycle.

In various embodiments, the AP and the wireless device can initiate a timer based on the periodicity. In that, the AP and the wireless device may utilize Time Synchronization Function (TSF) to synchronize the timer. The AP may utilize TSF to synchronize timers for all wireless devices in a Basic Service Set (BSS). In some embodiments, the AP can further broadcast or share a start time for the timer. The start time of the timer may be indicative of start of a rotation cycle for the MAC address of the wireless device. Upon receiving the beacon frame or the management frame indicative of the periodicity and the start time from the AP, the wireless device can initialize the timer. In certain embodiments, different wireless devices can independently initialize and maintain the timers, and also synchronize the timers with the AP by utilizing TSF. The AP and the wireless device can reinitialize the timers at each epoch determined by the periodicity, i.e., the rotation cycle.

In additional embodiments, upon expiration of the timer, i.e., at beginning of the rotation cycle, the AP and/or the wireless device may determine timestamp data. In some embodiments, the timestamp data can be indicative of a current time, i.e., a time of expiration of the timer. The timer may generate a trigger signal upon expiration. The trigger signal may be indicative of the current time at the expiration of the timer. In certain embodiments, the timestamp data can be indicative of a time of transmission or reception of a data frame. In that, in many embodiments, for example, the data frame can be a last data frame received before expiration of the timer or a first data frame received after expiration of the timer. The time associated with the data frame can be utilized to determine the timestamp data. In certain embodiments, the AP and/or wireless device may utilize the data frame for which an acknowledgement has been received, thereby ensuring that the AP and/or the wireless device utilize same data frame for generation of the next MAC address. In more embodiments, the timestamp data can be indicative of a time associated with the beacon frame. Hence, the AP and/or the wireless device may implement different techniques for generation of the timestamp data.

In further embodiments, the AP and/or the wireless device can determine seed data for generation of the MAC address. In some embodiments, for generating the seed data, the AP and/or the wireless device can decrypt the data frame. Thereafter, the AP and/or the wireless device may determine a predetermined number of bits to be utilized for generation of the seed data. The predetermined number of bits can be determined based on a key size utilized for a pseudorandom function. In certain embodiments, for example, for a key size x, the AP and/or the wireless device may extract last x bits from the decrypted frame. In more embodiments, for example, the predetermined number of bits can be extracted from a predetermined position or field in the decrypted data frame. In more embodiments, for example, a checksum or hash function may be applied to the predetermined number of bits. The AP and/or the wireless device can generate the seed data based on the predetermined number of bits.

In many more embodiments, the AP and/or the wireless device may apply the pseudorandom function on the seed data and the timestamp data to generate the MAC address. In some embodiments, for example, the pseudorandom function may utilize a shared secret key. The shared secret key can be transmitted by the AP to the wireless device at time of association of the wireless device with the AP. The AP and/or the wireless device can also utilize one or more cryptographic hash functions to generate the MAC address.

In that, the AP and/or the wireless device may utilize a Keyed-Hash Message Authentication Code (HMAC) to generate the MAC address. The AP and/or the wireless device can either utilize the timestamp data as is or encrypt the timestamp data for applying the HMAC. In certain embodiments, for example, the AP and/or the wireless device can utilize bitwise XOR operation in conjunction with a hash function to generate the MAC address. In more embodiments, for example, the AP and/or the wireless device may perform concatenation and hashing on the seed data and the timestamp data to generate the MAC address. In some more embodiments, the AP and/or the wireless device may perform one or more varied arithmetic operations in conjunction with the hash function to generate the MAC address. In numerous embodiments, for example, the AP and/or the wireless device can perform iterative pseudorandom functions to generate the MAC address. Hence, the address rotation technique of the present disclosure can provide a number of ways to generate the MAC address.

In many additional embodiments, the AP and/or the wireless device can initialize a Cryptographically Secure Pseudorandom Number Generator (CSPRNG). In some embodiments, for example, the AP and/or the wireless device may utilize a hardware based CSPRNG, an algorithmic CSPRNG, or a combinational CSPRNG. In certain embodiments, for example, the AP and/or the wireless device can utilize rekeying CSPRNGs that periodically refresh internal state or key data to prevent cryptographic attacks. In more embodiments, for example, the AP and/or the wireless device can select an appropriate CSPRNG based on availability of hardware resources and/or the cryptographic requirements for MAC address generation. The CSPRNG can generate random number data indicative of a random number. The random number data can be utilized to generate the seed data for the pseudorandom function to generate the MAC address.

In many further embodiments, the wireless device may operate in a sleep mode. In that, in some embodiments, the wireless device can operate in the sleep mode for a duration of time greater than the periodicity or the rotation cycle of the MAC address rotation. In that case, upon switching to an operational mode, the wireless device can reinitialize synchronization with the AP by transmitting a synchronization request to the AP. In certain embodiments, for example, the wireless device can transmit a null frame or a Target Wake Time (TWT) request frame to the AP. The AP may respond by transmitting a synchronization response to the wireless device. The wireless device can generate the MAC address based on the synchronization response. In more embodiments, to compensate for the time of the sleep mode, the wireless device can perform MAC address calculations for a number of epochs for which the wireless device operated in the sleep mode. In that, for example, the wireless device can generate the MAC addresses that the wireless device would have generated in the number of epochs if the wireless device had operated in the operational mode. In some more embodiments, the AP and the wireless device can jump to next MAC address based on common agreement or negotiation. In that, the wireless device may directly determine the next MAC address based on the common agreement or negotiation. For one or more data frames addressed to the wireless device during the sleep mode, in numerous embodiments, for example, the wireless device may continue receiving the one or more data frames based on the previous MAC address. In many more embodiments, for example, the AP may buffer and/or retransmit the one or more data frames to the next MAC address associated with the wireless device. Therefore, the AP may facilitate various methods to successfully recover the one or more data frames addressed to the wireless device when the wireless device operated in the sleep mode.

Advantageously, in the address rotation technique of the present disclosure, the AP and the wireless device may arrive at common agreement on the rotation cycle, thereby ensuring that all the wireless devices can rotate the MAC addresses at same intervals. The timer-based generation of the MAC addresses facilitates that the AP and the wireless device perform the MAC address calculation simultaneously. By utilizing synchronized timers, timestamp-based rotation cycles, and the data frames for the seed value, the AP and the STA can ensure consistent and secure MAC address rotations in the wireless communication network. Additionally, the deterministic nature of the rotation cycle, combined with the randomness introduced by the utilization of the data frames and the timestamp data further enhances security and unpredictability of the generated MAC addresses, thereby providing enhanced user privacy in the wireless communication network.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a wireless communication network 100, in accordance with various embodiments of the disclosure is shown. In many embodiments, the wireless communication network 100 includes an Access Point (AP) 110, a plurality of wireless devices 120 including first through third wireless devices 122-126, a Wireless Local Area Network (WLAN) Controller (WLC) 130, a Dynamic Host Configuration Protocol (DHCP) Server 140, and a DHCP database 150. In some embodiments, examples of the wireless devices 120 include but are not limited to smartphones, personal computers, tablets, watches, appliances etc. The wireless devices 120 can be in communication with the AP 110 by way of Wi-Fi. In that, the AP 110 can utilize one or more Radio Frequency (RF) channels to communicate with the wireless devices 120. The RF channels can be across various RF frequency bands, such as but not limited to, 2.4 GHZ, 5 GHz, and 6 GHz etc. for example. The wireless communication network 100 can also utilize mmWave bands or Sub-1 GHz band to communicate with certain types of the wireless devices 120. The wireless devices 120 may be assigned with Media Access Control (MAC) addresses that are unique identifiers to identify the wireless devices 120. Often, the MAC addresses are stored in a Network Interface Card (NIC) of the wireless devices 120. The AP 110 can rotate or randomize the MAC addresses assigned to the wireless devices 120. In some embodiments, for example, the AP 110 and the wireless devices 120 may calculate new MAC address. In certain embodiments, the AP 110 and the wireless devices 120 can select a MAC address from a plurality of MAC addresses. The AP 110 and the wireless devices can exchange one or more data frames based on corresponding MAC addresses of the wireless devices 120. The WLC 130 may monitor and manage multiple APs including the AP 110. The DHCP server 140 can be in communication with the WLC 130. The DHCP server 140 may store a pool of Internet Protocol (IP) addresses in the DHCP database 150. The DHCP database 150 may also store bindings between the IP addresses and the MAC addresses associated with the wireless devices 120.

In a number of embodiments, the AP 110 and the wireless devices 120 may negotiate a periodicity of address rotation. The AP 110 and the wireless devices 120 can initiate a timer based on the periodicity. Upon expiration of the timer, i.e., at beginning of the rotation cycle, the AP 110 and the wireless devices 120 may determine timestamp data. The AP 110 and the wireless devices 120 can also determine seed data for generation of the MAC addresses. Thereafter, the AP 110 and the wireless devices 120 may determine the MAC addresses based on the timestamp data and the seed data. In some embodiments, upon changing or rotating the MAC addresses of the wireless devices 120, the bindings between the IP addresses and the MAC addresses may also be updated and stored in the DHCP database 150.

In various embodiments, the third wireless device 126 can operate in a sleep mode. Upon waking up from the sleep mode, the third wireless device 126 may transmit a synchronization request to the AP 110. After receiving a synchronization response from the AP 110, the third wireless device 126 can determine the next MAC address.

Although a specific embodiment for the wireless communication network 100 for carrying out the various steps, processes, methods, and operations described herein is discussed with respect to FIG. 1, any of a variety of systems and/or processes may be utilized in accordance with embodiments of the disclosure. For example, the AP 110 may dynamically or periodically rotate the MAC addresses of the wireless devices 120. The elements depicted in FIG. 1 may also be interchangeable with other elements of FIGS. 2-8 as required to realize a particularly desired embodiment.

Figure 2:
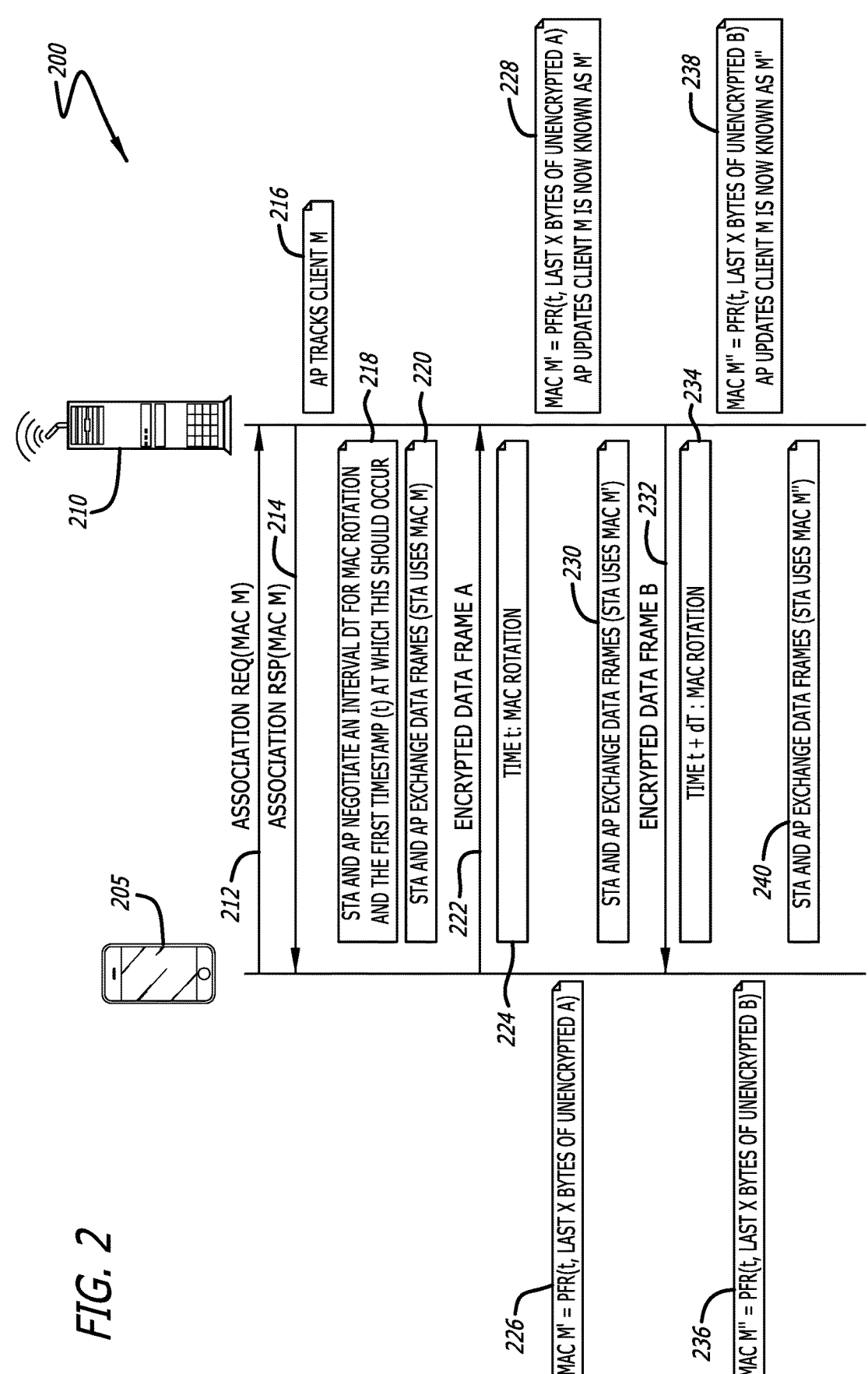
FIG. 2 is a conceptual illustration of communication between an AP and a wireless device in a wireless communication network, in accordance with various embodiments of the disclosure.

Referring to FIG. 2, a conceptual illustration of communication between an AP 210 and a wireless device 205 in a wireless communication network 200, in accordance with various embodiments of the disclosure is shown. In many embodiments, the wireless communication network 200 includes the AP 210 and the wireless device 205 that are in communication by way of Wi-Fi.

In a number of embodiments, at step 212, the wireless device 205 can transmit an association request to the AP 210. The wireless device 205 may utilize one or more network discovery protocols to select and associate with the AP 210. The association request may be indicative of one or more desired connection parameters such as but not limited to supported data rates, encryption methods, and other capabilities of the wireless device 205. The wireless device 205 can transmit multiple association requests to multiple APs including the AP 210 indicative of neighboring report requests. The wireless device 205 may thereafter select the AP 210 based on one or more network capabilities or requirements, or based on one or more neighboring reports received from the APs.

In various embodiments, at step 214, the AP 210 can respond with an association response transmitted to the wireless device 205. Examples of the association response may include but are not limited to standard association response, capability negotiation, authentication or handshake, error handling or failure responses, or fast Basic Service Set (BSS) transition response etc. Upon successful association, the wireless device 205 may become a member of a BSS associated with the AP 210.

In additional embodiments, at step 216, the AP 210 may track the wireless device 205 based on a MAC address M associated with the wireless device 205. The AP 210 can maintain or store a table of the MAC addresses associated with multiple wireless devices in the BSS including the wireless device 205. The AP 210 may also employ MAC address filtering to control access to the wireless communication network 200. The AP 210 can also track the MAC addresses of the wireless devices in the BSS to detect unauthorized or suspicious activity, trigger alerts, or log information related to network security.

In further embodiments, at step 218, the wireless device 205 and the AP 210 may negotiate the periodicity of the address rotation and a first timestamp at which a first address rotation must occur. The first timestamp can be indicative of start of a first rotation cycle for the MAC address rotation of the wireless device 205. The wireless device 205 and the AP 210 can initialize timers for a time duration indicated by the periodicity, i.e., for the time duration of the rotation cycle. The AP 210 and the wireless device 205 can start or reinitialize the corresponding timers at a time indicated by the first timestamp. The AP 210 and the wireless device 205 can utilize a Time Synchronization Function (TSF) to synchronize the timers.

In many more embodiments, at step 220, the AP 210 and the wireless device 205 can exchange the data frames. The data frames can be addressed to the MAC address M of the wireless device 205. Thereafter, at step 222, the wireless device 205 may transmit an encrypted data frame A to the AP 210. The encrypted data frame A may be a last data frame exchanged between the AP 210 and the wireless device 205 before the time indicated by the first timestamp occurs. The encrypted data frame A can be later utilized by the AP 210 and the wireless device 205 for generating next MAC address.

In many additional embodiments, at step 224, the AP 210 and the wireless device 205 can determine an epoch to generate the next MAC address, i.e., the time for MAC address rotation. The timers corresponding to the AP 210 and the wireless device 205 may expire and provide triggers to notify the time to the AP 210 and the wireless device 205 respectively. Upon expiration of the timers, at steps 226 and 228, the wireless device 205 and the AP 210, respectively, may generate the MAC address M'. For generating the MAC address M', the wireless device 205 and the AP 210 can first decrypt the encrypted data frame A of step 222. The wireless device 205 and the AP 210 may determine a pseudorandom function. Thereafter, the AP 210 and the wireless device 205 may determine a predetermined number of bits to be utilized for generation of seed data. The predetermined number of bits can be determined based on a key size utilized for the pseudorandom function. In certain embodiments, for example, for a key size x, the AP 210 and the wireless device 205 may extract last x bits from the decrypted frame. The predetermined number of bits can also be extracted from a predetermined position or field in the decrypted data frame. A checksum or hash function may also be applied on the predetermined number of bits. The AP 210 and the wireless device 205 can generate the seed data based on the predetermined number of bits. The AP 210 and the wireless device 205 may also encrypt the timestamp data. Thereafter, the AP 210 and the wireless device 205 can apply the pseudorandom function on the seed data and the timestamp data, or the seed data and the encrypted timestamp data, to generate the MAC address M'. The MAC address M' may be updated by the AP 210 in the table stored in the AP 210.

In many further embodiments, at step 230, the MAC address M' can be utilized for subsequent exchanges of the data frames between the AP 210 and the wireless device 205. At step 232, the AP 210 may transmit an encrypted data frame B to the wireless device 205. The encrypted data frame B may be the last data frame exchanged between the AP 210 and the wireless device 205 before the next epoch for MAC address rotation occurs. The encrypted data frame B can be later utilized by the AP 210 and the wireless device 205 for generating next MAC address.

In still many embodiments, at step 234, similar to step 224, the AP 210 and the wireless device 205 can determine the epoch to generate the next MAC address, i.e., the time for MAC address rotation. Upon expiration of the timers, at steps 236 and 238, the wireless device 205 and the AP 210 may generate the next MAC address M". The MAC address M" may be updated by the AP 210 in the table stored in the AP 210. Thereafter, at step 240, the MAC address M" can be utilized for subsequent exchanges of the data frames between the AP 210 and the wireless device 205.

Although a specific embodiment for the wireless communication network 200 for carrying out the various steps, processes, methods, and operations described herein is discussed with respect to FIG. 2, any of a variety of systems and/or processes may be utilized in accordance with embodiments of the disclosure. For example, the AP 210 and the wireless device 205 may employ different techniques or algorithms to determine/generate the timestamp data, seed data, and/or the MAC addresses. The elements depicted in FIG. 2 may also be interchangeable with other elements of FIG. 1 and FIGS. 3-8 as required to realize a particularly desired embodiment.

Figure 3:
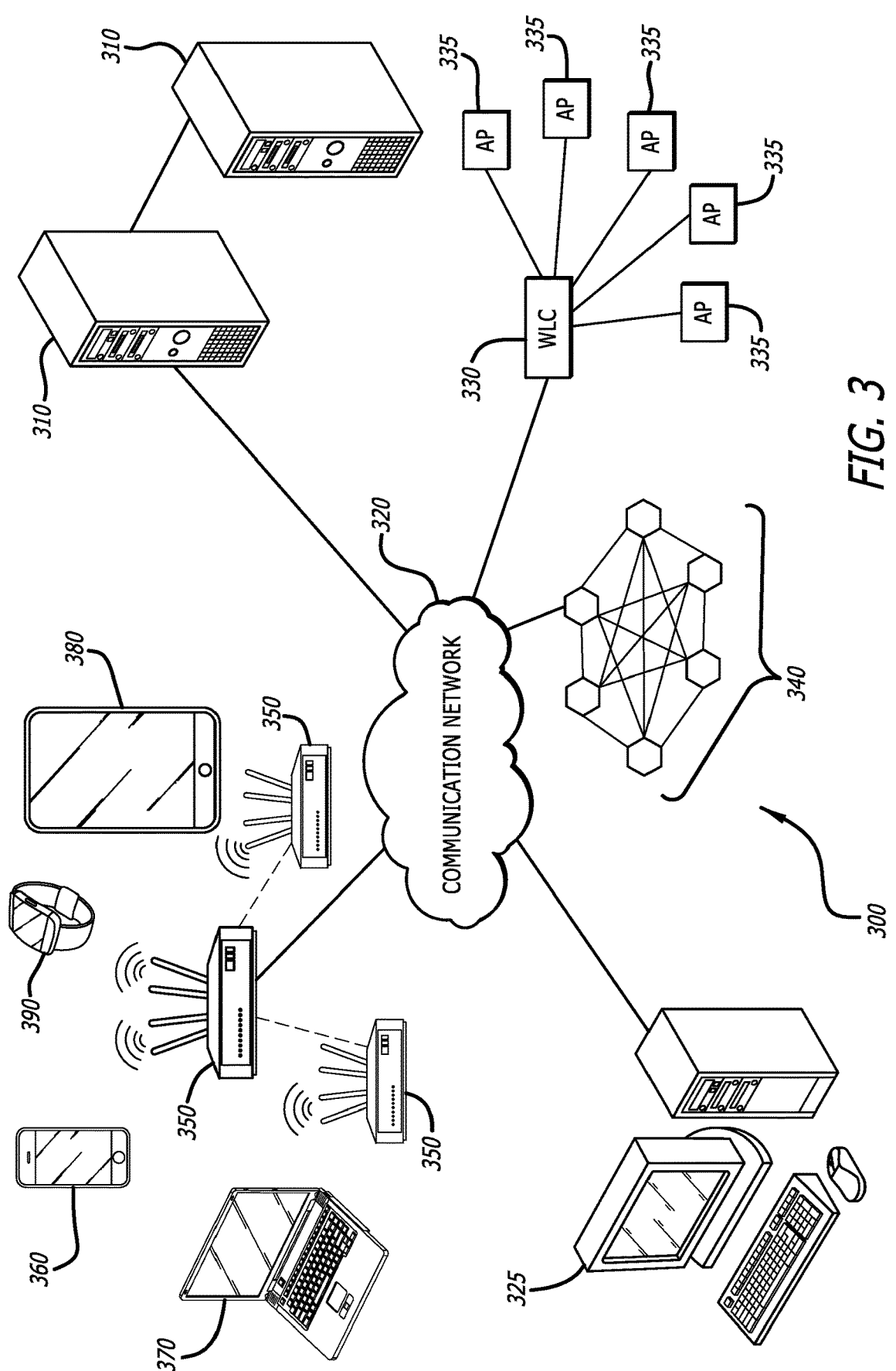
FIG. 3 is a conceptual network diagram of various environments that an address generator may operate on a plurality of network devices, in accordance with various embodiments of the disclosure.

Referring to FIG. 3, a conceptual network diagram 300 of various environments that an address generator may operate on a plurality of network devices, in accordance with various embodiments of the disclosure is shown. Those skilled in the art will recognize that the address generator can be comprised of various hardware and/or software deployments and can be configured in a variety of ways. In many embodiments, the address generator can be configured as a standalone device, exist as a logic in another network device, be distributed among various network devices operating in tandem, or remotely operated as part of a cloud-based network management tool. In further embodiments, one or more servers 310 can be configured with or otherwise operate the address generator. In many embodiments, the address generator may operate on one or more servers 310 connected to a communication network 320. The communication network 320 can include wired networks or wireless networks. In many embodiments, the communication network 320 may be a Wi-Fi network operating on various frequency bands, such as, 2.4 GHZ, 5 GHz, or 6 GHz. In further embodiments, the address generator operating on the servers 310 can facilitate in generating, rotating, or randomizing the MAC addresses for the wireless devices in the network 300. The address generator can be provided as a cloud-based service that can service remote networks, such as, but not limited to a deployed network 340. In many embodiments, the address generator can be a logic that generates MAC addresses or rotates the MAC addresses periodically.

However, in additional embodiments, the address generator may be operated as a distributed logic across multiple network devices. In the embodiment depicted in FIG. 3, a plurality of APs 350 can operate as the address generator in a distributed manner or may have one specific device operate as the address generator for all of the neighboring or sibling APs 350. The APs 350 facilitate Wi-Fi connections for various electronic devices, such as but not limited to mobile computing devices including laptop computers 370, cellular phones 360, portable tablet computers 380 and wearable computing devices 390.

In further embodiments, the address generator may be integrated within another network device. In the embodiment depicted in FIG. 3, a wireless LAN controller (WLC) 330 may have an integrated address generator that the WLC 330 can use to generate the MAC addresses for the devices associated with the various APs 335 that the WLC 330 is connected to, either wired or wirelessly. In still more embodiments, a personal computer 325 may be utilized to access and/or manage various aspects of the address generator, either remotely or within the network itself. In the embodiment depicted in FIG. 3, the personal computer 325 communicates over the communication network 320 and can access the address generator of the servers 310, or the network APs 350, or the WLC 330.

Although a specific embodiment for various environments that the address generator may operate on a plurality of network devices suitable for carrying out the various steps, processes, methods, and operations described herein is discussed with respect to FIG. 3, any of a variety of systems and/or processes may be utilized in accordance with embodiments of the disclosure. In many non-limiting examples, the address generator may be provided as a device or software separate from the network devices or the address generator may be integrated into the network devices. The elements depicted in FIG. 3 may also be interchangeable with other elements of FIGS. 1-2 and 4-8 as required to realize a particularly desired embodiment.

Referring now to FIG. 4, a flowchart depicting a process 400 for generating the MAC address, in accordance with various embodiments of the disclosure is shown. In many embodiments, the process 400 may negotiate the periodicity of the address rotation for the wireless device (block 410). In some embodiments, the process 400 can be performed by the AP or the wireless device. In certain embodiments, the periodicity may indicate the period of time after which the wireless device must be assigned next MAC address or calculate the new MAC address. In more embodiments, the periodicity can be different for different wireless devices. In some more embodiments, the wireless devices may negotiate the periodicity while being connected to the AP or when associating with the AP. In numerous embodiments, the periodicity can be broadcast by the AP, and utilized by the wireless devices in communication with the AP. In that, in many more embodiments, the AP can broadcast the periodicity by way of one or more management frames or beacon frames.

In a number of embodiments, the process 400 can initialize the timer based on the periodicity (block 420). In some embodiments, the AP and the wireless device may utilize TSF to synchronize the timer. In certain embodiments, the AP may utilize TSF to synchronize timers for all wireless devices in the BSS. In more embodiments, the start time of the timer may be indicative of start of a rotation cycle for the MAC address of the wireless device. In some more embodiments, upon receiving the beacon frame or the management frame indicative of the periodicity and the start time, the wireless device can initialize the timer. In numerous embodiments, different wireless devices can independently initialize and maintain the timers, and also synchronize the timers with the AP by utilizing TSF. In many more embodiments, the AP and the wireless device can reinitialize the timers at each epoch determined by the periodicity, i.e., the rotation cycle.

In various embodiments, the process 400 may exchange the data frames using the MAC address (block 430). In some embodiments, the MAC address may be included in headers of the data frames addressed to the wireless device. In certain embodiments, the AP can examine the MAC addresses of incoming data frames and forward the data frames to appropriate wireless devices based on a MAC address lookup in a forwarding table stored in the AP. In more embodiments, the wireless devices can use broadcast and multicast MAC addresses to communicate with multiple devices simultaneously.

In additional embodiments, the process 400 can determine whether the timer has expired (block 440). In some embodiments, the process 400 may receive a trigger signal from the timer when the timer expires. In certain embodiments, the process 400 can monitor the timer by one or more techniques, such as but not limited to polling the timer or utilizing real-time clocks to monitor or manage the timer. In more embodiments, the expiration of the timer can indicate that the time period of the rotation cycle has elapsed and that it is time for the wireless device to rotate the MAC address.

If at block 440, the process 400 determines that the timer has not elapsed, in further embodiments, the process 400 can continue receiving the data frames (block 430). If at block 440, the process 400 determines that the timer has elapsed, in many more embodiments, the process 400 can generate the seed data based on the one or more data frames (block 450). In some embodiments, the process 400 may determine the seed data based on a received data frame. In certain embodiments, the received data frame can be in encrypted form. In more embodiments, for generating the seed data, the process 400 can decrypt the data frame. Thereafter, in some more embodiments, the process 400 may determine the predetermined number of bits to be utilized for generation of the seed data. In numerous embodiments, the process 400 can determine the predetermined number of bits based on the key size utilized for the pseudorandom function. In certain embodiments, for example, for a key size x, the process 400 may extract last x bits from the decrypted frame. In more embodiments, for example, the predetermined number of bits can be extracted from the predetermined position or field in the decrypted data frame. In more embodiments, for example, the checksum or hash functions may be applied to the predetermined number of bits. In many more embodiments, the process 400 can generate the seed data based on the predetermined number of bits.

In many additional embodiments, the process 400 may determine the timestamp data based on the periodicity or the data frame (block 460). In some embodiments, the timestamp data can be indicative of the current time, i.e., the time of expiration of the timer. In certain embodiments, the timestamp data can be indicative of the time of transmission or reception of the data frame. In that, in more embodiments, for example, the data frame can be the last data frame received before expiration of the timer or the first data frame received after expiration of the timer. In some more embodiments, the time associated with the data frame can be utilized to determine the timestamp data. In numerous embodiments, the process 400 may utilize the data frame for which the acknowledgement has been received, thereby ensuring that the AP and/or the wireless device utilize same data frame for generation of the next MAC address. In many more embodiments, the timestamp data can be indicative of the time associated with the beacon frame.

In many further embodiments, the process 400 can apply the pseudorandom function on the seed data and the timestamp data (block 470). In some embodiments, the pseudorandom function may utilize a shared secret key. In certain embodiments, the shared secret key can be transmitted by the AP to the wireless device at time of association of the wireless device with the AP. In more embodiments, the process 400 can also utilize one or more cryptographic hash functions to generate the MAC address. In that, in some more embodiments, the process 400 may utilize a Keyed-Hash Message Authentication Code (HMAC) to generate the MAC address. In numerous embodiments, the process 400 can either utilize the timestamp data as is or encrypt the timestamp data for applying the HMAC. In many more embodiments, for example, the process 400 can utilize bitwise XOR operation in conjunction with a hash function to generate the MAC address. In many further embodiments, for example, the process 400 may perform concatenation and hashing on the seed data and the timestamp data to generate the MAC address. In many more embodiments, the process 400 may perform one or more varied arithmetic operations in conjunction with the hash function to generate the MAC address. In many additional embodiments, for example, the process 400 can perform iterative pseudorandom functions to generate the MAC address.

In still many embodiments, the process 400 can generate the new MAC address based on the pseudorandom function (block 480). In some embodiments, the new MAC address may be updated by the AP in the table stored in the AP. In certain embodiments, the new MAC address can be utilized for subsequent exchanges of the data frames between the AP and the wireless device.

In still further embodiments, the process 400 may reinitialize the timer (block 490). In some embodiments, the reinitialization of the timer can indicate beginning of the next rotation cycle. In certain embodiments, the process 400 can continue utilizing the new MAC address until the timer expires.

Although a specific embodiment for the process 400 for generating the MAC address for carrying out the various steps, processes, methods, and operations described herein is discussed with respect to FIG. 4, any of a variety of systems and/or processes may be utilized in accordance with embodiments of the disclosure. For example, the process 400 can ensure that new MAC address is generated after every rotation cycle. The elements depicted in FIG. 4 may also be interchangeable with other elements of FIGS. 1-3 and FIGS. 5-8 as required to realize a particularly desired embodiment.

Referring now to FIG. 5, a flowchart depicting a process 500 for generating the MAC address, in accordance with various embodiments of the disclosure is shown. In many embodiments, the process 500 can receive the trigger signal from the timer (block 510). In more embodiments, the process 500 can be implemented by the AP and/or the wireless device. In some embodiments, the expiration of the timer may indicate the start of the rotation cycle. In certain embodiments, the trigger signal can be a periodic signal received after every rotation cycle.

In a number of embodiments, the process 500 may receive the data frame associated with the wireless device (block 520). In some embodiments, the data frame can include the MAC address of the wireless device in the header. In more embodiments, the data frame can be in the encrypted form.

In various embodiments, the process 500 can decrypt the data frame (block 530). In some embodiments, the process 500 can utilize one or more network protocols such as but not limited to Pre-Shared Key (PSK), Wi-Fi Protected Access (WPA/WPA2), Public Key Infrastructure (PKI), etc. for example to decrypt the data frame. In certain embodiments, the process 500 may only utilize those data frames for generating the seed data, for which the acknowledgment has been received, to ensure that the AP and the wireless device utilize same and correct data frame for generation of the seed data.

In additional embodiments, the process 500 may determine the key size for a pseudorandom function (block 540). In some embodiments, the process 500 can determine the key sized based on one or more of: security requirements, algorithm recommendations, performance considerations, and algorithm-specific requirements, etc. for example. In certain embodiments, the key size may vary for different applications and/or different wireless devices.

In further embodiments, the process 500 can determine the predetermined number of bits based on the key size (block 550). In some embodiments, for example, for a key size x, the process 500 may extract last x bits from the decrypted frame. In certain embodiments, for example, the predetermined number of bits can be extracted from the predetermined position or field in the decrypted data frame.

In many more embodiments, the process 500 may generate the seed data based on the predetermined number of bits (block 560). In some embodiments, for example, the checksum or hash functions may be applied on the predetermined number of bits to generate the seed data. In certain embodiments, the process 500 can generate the seed data based on the random number data. In more embodiments, the process 500 may generate the seed data based on the shared secret key.

In many additional embodiments, the process 500 can determine the timestamp data based on a period of the timer or the time of the data frame (block 570). In some embodiments, the timestamp data can be indicative of a current time, i.e., a time of expiration of the timer. In certain embodiments, the timestamp data can be indicative of a time of transmission or reception of the data frame. In that, in many embodiments, for example, the data frame can be the last data frame received before expiration of the timer or the first data frame received after expiration of the timer.

In many further embodiments, the process 500 may generate the MAC address based on the timestamp data and the seed data (block 580). In some embodiments, the process 500 may perform one or more varied arithmetic operations in conjunction with the hash function to generate the MAC address. In numerous embodiments, for example, the process 500 can perform iterative pseudorandom functions to generate the MAC address.

Although a specific embodiment for the process 500 for generating the MAC address for carrying out the various steps, processes, methods, and operations described herein is discussed with respect to FIG. 5, any of a variety of systems and/or processes may be utilized in accordance with embodiments of the disclosure. For example, the process 500 can generate the seed data based on data traffic between the AP and the wireless device. The elements depicted in FIG. 5 may also be interchangeable with other elements of FIGS. 1-4 and FIGS. 6-8 as required to realize a particularly desired embodiment.

Referring now to FIG. 6, a flowchart depicting a process 600 for utilizing the CSPRNG for generation of the MAC address, in accordance with various embodiments of the disclosure is shown. In many embodiments, the process 600 can receive the trigger signal indicative of expiration of the timer (block 610). In many embodiments, the process 600 can be implemented by the AP and/or the wireless device. In some embodiments, the expiration of the timer may indicate the start of the rotation cycle. In certain embodiments, the trigger signal can be a periodic signal received after every rotation cycle.

In a number of embodiments, the process 600 can determine the shared secret key associated with the wireless device (block 620). In some embodiments, for example, the process 600 may determining the shared secret key by utilizing the PSK that is configured manually or administratively. In certain embodiments, for example, the process 600 can utilize one or more key exchange protocols to determine the shared secret key. In more embodiments, for example, the process 600 may utilize certificate-based key exchange or session keys.

In various embodiments, the process 600 may initialize the CSPRNG (block 630). In some embodiments, for example, the process 600 may utilize a hardware based CSPRNG, an algorithmic CSPRNG, or a combinational CSPRNG. In certain embodiments, for example, the process 600 can utilize rekeying CSPRNGs that periodically refresh internal state or key data to prevent cryptographic attacks. In more embodiments, for example, the process 600 can select an appropriate CSPRNG based on availability of hardware resources and/or the cryptographic requirements for MAC address generation.

In additional embodiments, the process 600 can generate the random number data based on the CSPRNG (block 640). In some embodiments, for example, the process 600 may configure the CSPRNG to generate the random number of a predetermined size. In certain embodiments, for example, the random number may be within a predefined range. In more embodiments, for example, the process 600 can utilize modulo reduction or rejection sampling to generate the random number within the predefined range.

In further embodiments, the process 600 can generate the seed data based on the random number data (block 650). In some embodiments, the process 600 may utilize the random number data directly for generating the seed data or may perform one or more hashing or mathematical operations on the random number data to generate the seed data. In certain embodiments, the process 600 can also generate the seed data by utilizing the shared secret key.

In many more embodiments, the process 600 may determine the timestamp data based on the period of the timer or the time of the data frame (block 660). In some embodiments, the timestamp data can be indicative of a current time, i.e., a time of expiration of the timer. In certain embodiments, the timestamp data can be indicative of a time of transmission or reception of the data frame. In that, in many embodiments, for example, the data frame can be the last data frame received before expiration of the timer or the first data frame received after expiration of the timer.

In many additional embodiments, the process 600 may generate the MAC address based on the timestamp data and the seed data (block 670). In some embodiments, the process 600 may perform one or more varied arithmetic operations in conjunction with the hash function to generate the MAC address. In numerous embodiments, for example, the process 600 can perform iterative pseudorandom functions to generate the MAC address.

Although a specific embodiment for the process 600 for utilizing the CSPRNG for generation of the MAC address for carrying out the various steps, processes, methods, and operations described herein is discussed with respect to FIG. 6, any of a variety of systems and/or processes may be utilized in accordance with embodiments of the disclosure. For example, the process 600 can generate the MAC address based on random numbers. The elements depicted in FIG. 6 may also be interchangeable with other elements of FIGS. 1-5 and FIGS. 7-8 as required to realize a particularly desired embodiment.

Figure 7:
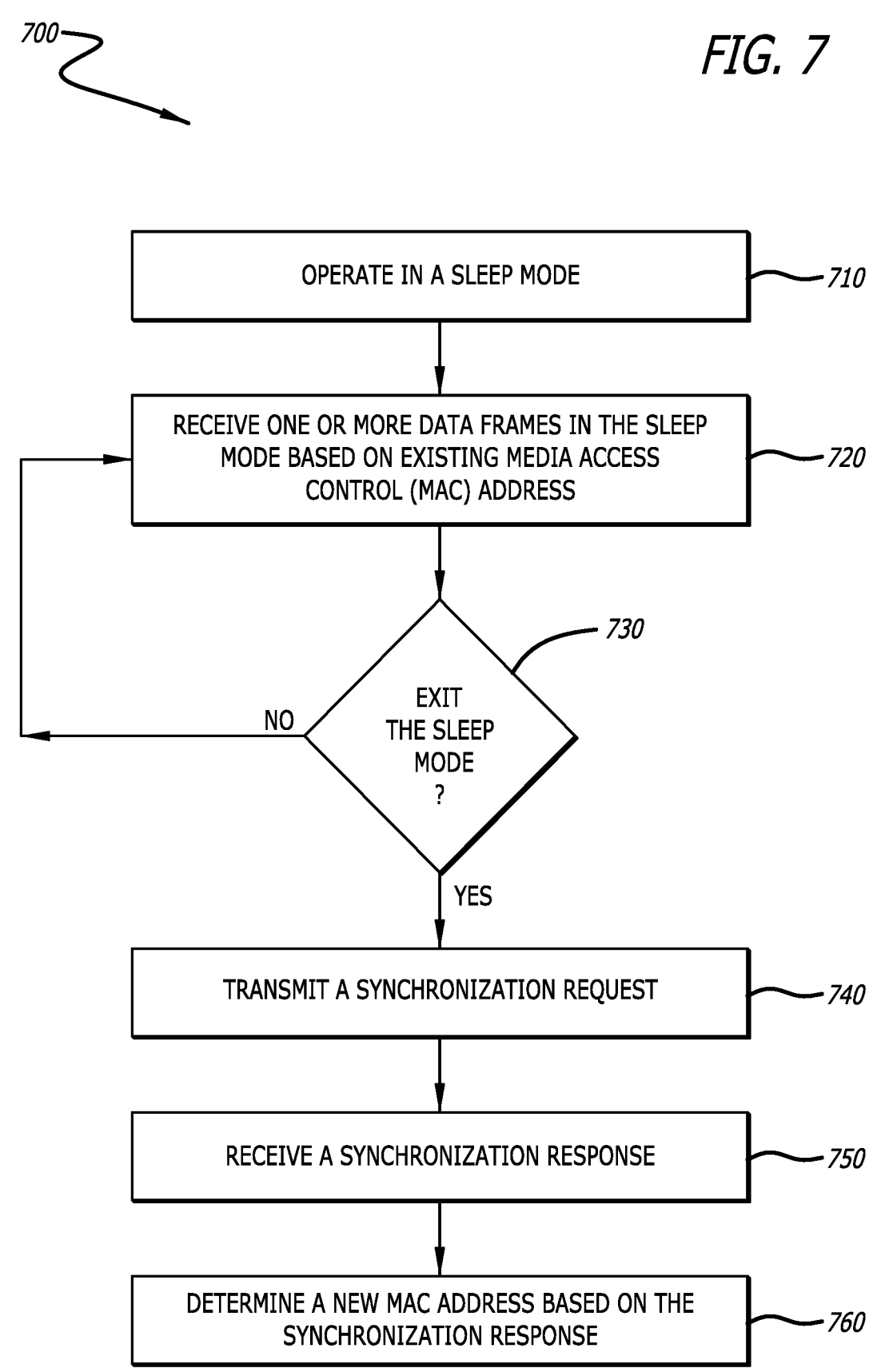
FIG. 7 is a flowchart depicting a process for operating a wireless device in a sleep mode, in accordance with various embodiments of the disclosure.

Referring now to FIG. 7, a flowchart depicting a process 700 for operating the wireless device in the sleep mode, in accordance with various embodiments of the disclosure is shown. In many embodiments, the process 700 can operate in the sleep mode (block 710). In some embodiments, the process 700 may be implemented by the wireless device. In certain embodiments, the process 700 can operate in the sleep mode for a duration of time greater than the periodicity or the rotation cycle of the MAC address rotation. In more embodiments, the sleep mode may be a low power mode or a hibernation mode etc. for example.

In a number of embodiments, the process 700 can receive one or more data frames in the sleep mode based on an existing MAC address (block 720). In some embodiments, the process 700 may receive the beacon frame from the AP. In certain embodiments, for example, the process 700 can incorporate power management features that can allow the process 700 to negotiate sleep periods with the AP. In more embodiments, during the sleep periods, the process 700 can operate the wireless device in a low-power state and maintain communication with the AP by periodically waking up to receive the beacon frames or other control messages.

In various embodiments, the process 700 may determine whether the process 700 should exit the sleep mode (block 730). In some embodiments, the beacon frame can be utilized by the process 700 to wake up and check for any pending data frames addressed to the MAC address. In certain embodiments, for example, if any pending data frame is detected, the process 700 may remain awake to process the data frame or return to the sleep mode after a predefined period. In more embodiments, for example, the process 700 may utilize one or more wake-up signals or triggers from external sources to exit sleep mode and check for incoming data frames. In some more embodiments, for example, the wake-up signals can be generated by external sensors, timers, or communication protocols, indicating the arrival of the data frames or the need to check for the pending data frames. In numerous embodiments, for example, the AP may buffer the incoming data frames addressed to the wireless device until the wireless device wakes up and becomes active. In many more embodiments, the process 700 can enable the wireless device to remain in the sleep mode while still being capable of receiving and processing the incoming data frames addressed to the existing MAC address.

If at block 730, the process 700 determines to continue operating in the sleep mode, in additional embodiments, the process 700 can continue receiving the data frames (block 720). If at block 730, the process 700 determines to wake up, in further embodiments, the process 700 may transmit a synchronization request (block 740). In some embodiments, when the wireless device wakes up, the process 700 may communicate with the AP to retrieve the buffered data frames waiting for the wireless device. In certain embodiments, this may allow the process 700 to receive the pending data frames that arrived while the wireless device was in the sleep mode. In more embodiments, the process 700 can transmit a null frame or a Target Wake Time (TWT) request frame to the AP.

In many more embodiments, the process 700 can receive a synchronization response (block 750). In some embodiments, the synchronization response can be the TWT response. In more embodiments, the synchronization response may include the beacon frame and/or the pending data frames addressed to the wireless device.

In many additional embodiments, the process 700 may determine the new MAC address based on the synchronization response (block 760). In some embodiments, to compensate for the time of the sleep mode, the process 700 can perform the MAC address calculations for a number of epochs for which the wireless device operated in the sleep mode. In that, in certain embodiments, for example, the process 700 can generate the MAC addresses that the process 700 would have generated in the number of epochs if the wireless device had operated in the operational mode. In more embodiments, the AP and the wireless device can jump to next MAC address based on common agreement or negotiation. In that, in numerous embodiments, the process 700 may directly determine the next MAC address based on the common agreement or negotiation. In many further embodiments, for example, for the data frames addressed to the wireless device during the sleep mode, for example, the process 700 may continue receiving the data frames based on the previous MAC address. In still many embodiments, for example, the AP may adjust or retransmit the one or more data frames to the next MAC address associated with the wireless device.

Although a specific embodiment for the process 700 for operating the wireless device in the sleep mode for carrying out the various steps, processes, methods, and operations described herein is discussed with respect to FIG. 7, any of a variety of systems and/or processes may be utilized in accordance with embodiments of the disclosure. For example, the process 700 may facilitate various methods to successfully recover the data frames addressed to the wireless device when the wireless device operated in the sleep mode. The elements depicted in FIG. 7 may also be interchangeable with other elements of FIGS. 1-6 and FIG. 8 as required to realize a particularly desired embodiment.

Figure 8:
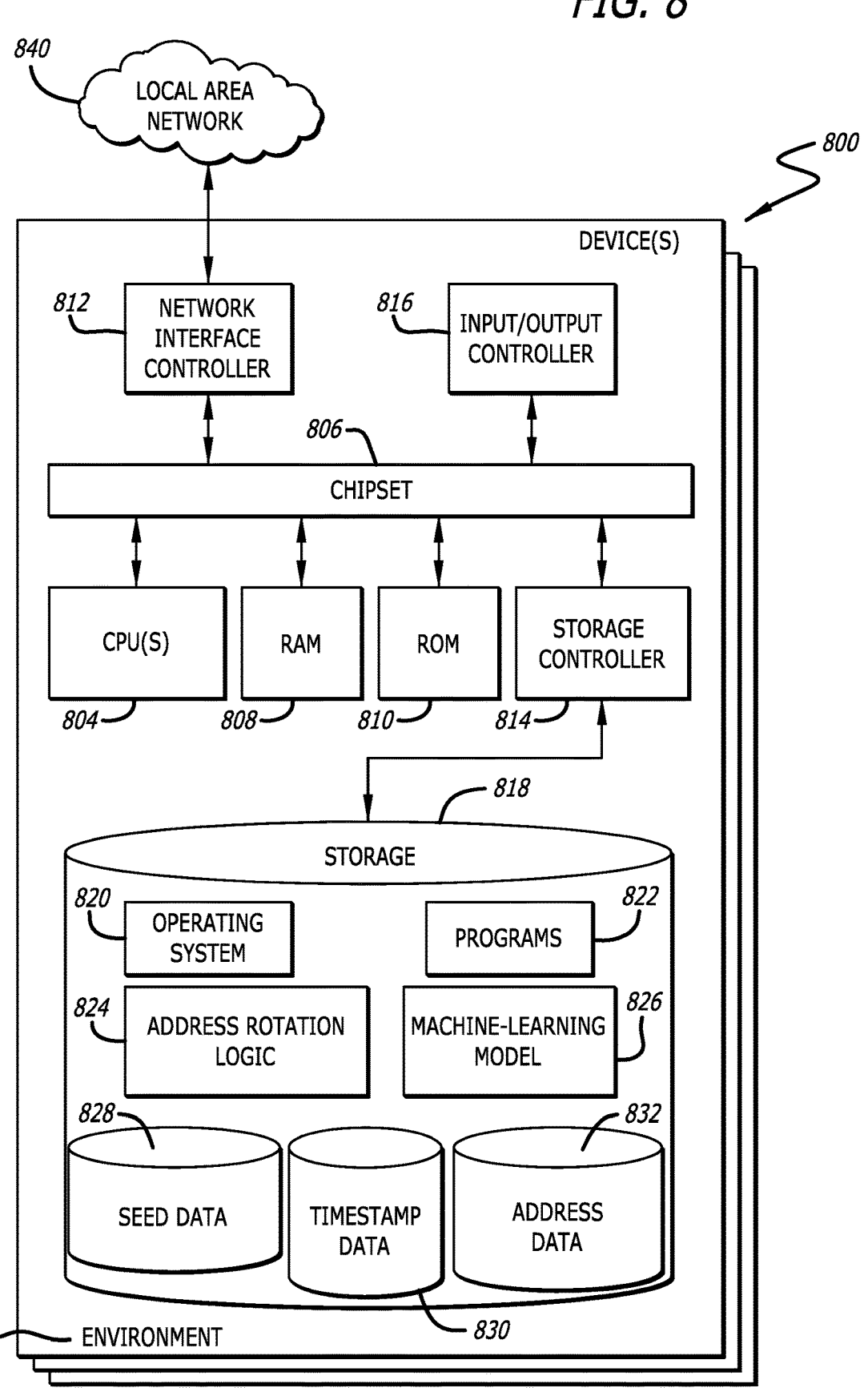
FIG. 8 is a conceptual block diagram of a device suitable for configuration with an address rotation logic, in accordance with various embodiments of the disclosure.

Referring to FIG. 8, a conceptual block diagram of a device 800 suitable for configuration with an address rotation logic, in accordance with various embodiments of the disclosure is shown. The embodiment of the conceptual block diagram depicted in FIG. 8 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 8 can also illustrate an access point, a switch, or a router in accordance with various embodiments of the disclosure. The device 800 may, in many non-limiting examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In a number of embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Additional embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for instance, store an operating system 820, applications 822, seed data 828, timestamp data 830, and address data 832 which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The seed data 828 can include the predetermined number of bits of the data frames, the random data, and/or the shared secret key. The timestamp data 830 may include timestamps associated with the current time, timer expiration, and/or data frames. The address data 832 can include the MAC addresses generated by the device 800.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

In many more embodiments, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In many additional embodiments, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In certain embodiments, the device 800 can also include computer-readable storage media having instructions stored thereupon for performing any of the other computer-implemented operations described herein.

In many further embodiments, the device 800 may include an address rotation logic 824. The address rotation logic 824 can be configured to perform one or more of the various steps, processes, operations, and/or other methods that are described above. Often, the address rotation logic 824 can be a set of instructions stored within a non-volatile memory that, when executed by the processor(s)/controller(s) 804 can carry out these steps, etc. In some embodiments, the address rotation logic 824 may be a client application that resides on a network-connected device, such as, but not limited to, a server, switch, personal or mobile computing device in a single or distributed arrangement. The address rotation logic 824 can generate the MAC addresses for the device 800 in every rotation cycle.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG.

8 and can include other components that are not explicitly shown in FIG. 8 or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 900 to perform functions described herein. The virtualization layer may generally support a virtual resource that performs at least a portion of the techniques described herein.

Finally, in numerous additional embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826.

The ML model(s) 826 can be configured to generate inferences to make predictions or draw conclusions from data. An inference can be considered the output of a process of applying a model to new data. This can occur by learning from at least the seed data 828, the timestamp data 830, and the address data 832 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 826 may be generated by human/administrator verifications or may compare predicted outcomes with actual outcomes.

Although a specific embodiment for the device 800 suitable for configuration with the address rotation logic for carrying out the various steps, processes, methods, and operations described herein is discussed with respect to FIG. 8, any of a variety of systems and/or processes may be utilized in accordance with embodiments of the disclosure. For example, the device 800 may be in a virtual environment such as a cloud-based network administration suite, or it may be distributed across a variety of network devices or switches. The elements depicted in FIG. 8 may also be interchangeable with other elements of FIGS. 1-7 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:

a processor;

a memory communicatively coupled to the processor; and an address rotation logic, configured to:

determine a periodicity of address rotation for a wireless device;

initiate a timer based on the periodicity;

determine, upon expiration of the timer, seed data and timestamp data indicative of a time of transmission;

apply a pseudorandom function on the seed data and the timestamp data to generate a Media Access Control (MAC) address; and transmit a data frame to the wireless device.

2. The device of claim 1, wherein the address rotation logic is further configured to;

receive the data frame from the wireless device.

3. The device of claim 2, wherein the timestamp data is indicative of a time of transmission or reception of the data frame.

4. The device of claim 2, wherein the timestamp data is indicative of a time of expiration of the timer.

5. The device of claim 4, wherein the address rotation logic is further configured to:

decrypt the data frame to generate a decrypted data frame;

determine a predetermined number of bits of the decrypted data frame; and generate the seed data based on the predetermined number of bits.

6. The device of claim 5, wherein the address rotation logic is further configured to determine the predetermined number of bits based on a key size of the pseudorandom function.

7. The device of claim 1, wherein the address rotation logic is further configured to:

initialize a cryptographically secure pseudorandom number generator;

generate random number data based on the cryptographically secure pseudorandom number generator; and generate the seed data based on the random number data.

8. The device of claim 1, wherein the address rotation logic is further configured to:

determine a shared secret key associated with the wireless device; and generate the seed data based on the shared secret key.

9. The device of claim 8, wherein the address rotation logic is further configured to apply a cryptographic hash function on the timestamp data and the shared secret key to generate the MAC address.

10. The device of claim 1, wherein the address rotation logic is further configured to reinitiate the timer after generating the MAC address.

11. The device of claim 1, wherein the address rotation logic is further configured to:

operate in a sleep mode;

transmit a synchronization request upon switching from the sleep mode to an operational mode;

receive a synchronization response in response to the synchronization request; and determine the MAC address based on the synchronization response.

12. The device of claim 11, wherein the synchronization request is at least one of:

a null data frame; or a Target Wake Time (TWT) request frame.

13. The device of claim 11, wherein the address rotation logic is further configured to receive a plurality of data frames in the sleep mode based on a previous MAC address.

14. The device of claim 1, wherein, after a period of time indicated by the periodicity, the timer expires or reinitializes.

15. A device, comprising:

a processor;

a memory communicatively coupled to the processor; and an address rotation logic, configured to:

determine a periodicity of address rotation for a wireless device;

receive a data frame from the wireless device;

determine timestamp data based on the periodicity or the data frame;

generate a Media Access Control (MAC) address based on the timestamp data and the data frame;

decrypt the data frame to generate a decrypted data frame;

determine a predetermined number of bits of the decrypted data frame;

generate seed data based on the predetermined number of bits; and apply a pseudorandom function on the seed data and the timestamp data to generate the MAC address.

16. The device of claim 15, wherein the address rotation logic is further configured to:

determine a shared secret key associated with the wireless device; and apply a cryptographic hash function on the timestamp data and the shared secret key to generate the MAC address.

17. A method, comprising:

determining a periodicity of address rotation for a wireless device;

initiating a timer based on the periodicity;

determining, upon expiration of the timer, seed data and timestamp data;

applying a pseudorandom function on the seed data and the timestamp data to generate a Media Access Control (MAC) address:

receiving a data frame from the wireless device;

determining the seed data based on the data frame; and determining the timestamp data based on the timer or the data frame.

18. A device, comprising:

a processor;

a memory communicatively coupled to the processor; and an address rotation logic, configured to:

determine a periodicity of address rotation for a wireless device;

initiate a timer based on the periodicity;

determine, upon expiration of the timer, seed data and timestamp data indicative of a reception of a data frame;

apply a pseudorandom function on the seed data and the timestamp data to generate a Media Access Control (MAC) address; and receive the data frame from the wireless device.

* * * * *